J. W. WILLIAMS.

LOCK-WORK ATTACHMENT FOR CLOCKS.

No. 7,594. Reissued April 3, 1877.

Witnesses,

Chas. N. Smith

Geo. T. Pinckney

Inventor

John W. Williams per Lemuel W. Serrell

Atty

N. PETERS, PHOTO-LITHOGRAPHER, WASHINGTON, D. C.

UNITED STATES PATENT OFFICE.

JOHN W. WILLIAMS, OF NEW YORK, N. Y.

IMPROVEMENT IN LOCK-WORK ATTACHMENTS FOR CLOCKS.

Specification forming part of Letters Patent No. 183,094, dated October 10, 1876; reissue No. 7,594, dated April 3, 1877; application filed March 12, 1877.

*To all whom it may concern:*

Figure 1:
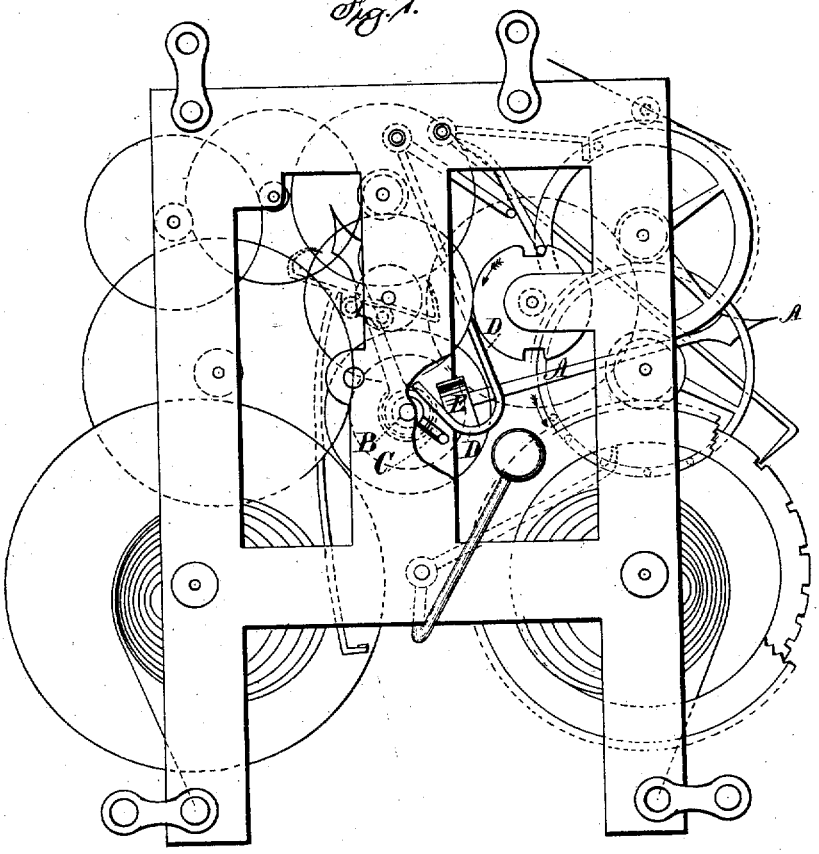
Figure 2:
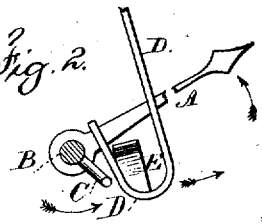
Figure 3:
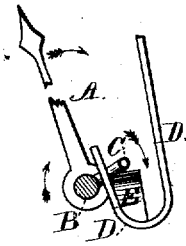
Figure 4:
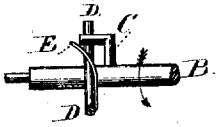

Be it known that I, JOHN W. WILLIAMS, of the city, county, and State of New York, have invented a new and useful Improvement in Clock-Works, of which the following is a specification:

Figure 1 is a rear view of a clock-work to which my improvement has been applied. Fig. 2 is a detail view, illustrating the movement when the hands are turned forward. Fig. 3 is a detail view, illustrating the movement when the hands are turned backward. Fig. 4 is a plan view of the parts as turned partially back.

Similar letters of reference indicate corresponding parts.

The object of this invention is to furnish an improved attachment for the works of striking-clocks, to enable the hands to be turned back in setting the clocks without any danger of breaking any part of the said works, and which shall be simple in construction, and will not increase the cost of the works.

Lifting devices for striking-clocks have been made with a V or cam shaped piece of metal upon the arbor of the minute-hand, acting against a straight wire that lets off the striking device.

My improvement is made for employing the ordinary bent-wire hook upon the arbor of the minute-hand and the ordinary bent trip-wire, and for allowing the clock-hands to be turned back without injury to the parts. This is accomplished by an inclined or cam plate upon the trip-wire, that causes the hook or bent arm upon the arbor to force the trip-wire aside laterally if the hands are turned back past the hour. The trip-wire springs back to place when the bent arm passes clear of the incline; but it operates in the usual manner when the striking mechanism is disengaged or tripped.

A is the minute-hand, which is attached to the shaft B, and is carried around by and with it.

To the shaft B is attached an arm, C, which, at each revolution of the shaft B, strikes and pushes back the trip-wire D, which releases the striking mechanism and allows it to strike.

With the ordinary construction of trip-wire, if the minute-hand A is turned back, as the arm C comes around, it catches upon the trip-wire D, and if the hand A is turned back any farther something must break.

To prevent this breakage I employ a small inclined or cam plate, E, upon the trip-wire D, in such a position that, as the arm C comes around, its end will strike against the plate E, push the trip-wire D to one side, and pass it without releasing the striking mechanism or injuring the parts, and the trip-wire springs back again.

Having thus described my invention, I claim as new and desire to secure by Letters Patent—

The combination, with the hook or bent arm C and the trip-wire D, of an incline or cam plate, E, upon the trip-wire D, and operating in the manner and for the purposes set forth.

Signed by me this 5th day of March, A. D. 1877.

JOHN W. WILLIAMS.

Witnesses:

GEO. T. PINCKNEY,

GEO. D. WALKER.